US008617342B1

(12) United States Patent
Gendreau et al.

(10) Patent No.: US 8,617,342 B1
(45) Date of Patent: Dec. 31, 2013

(54) AIR CLAMP

(75) Inventors: Errol Gendreau, Eloy, AZ (US); Santiago Rodriguez, Casa Grande, AZ (US)

(73) Assignee: Errol Gendreau, Eloy, AZ (US)

( * ) Notice: Subject to any disclaimer, the term of this patent is extended or adjusted under 35 U.S.C. 154(b) by 0 days.

(21) Appl. No.: 13/367,194

(22) Filed: Feb. 6, 2012

Related U.S. Application Data

(62) Division of application No. 12/135,931, filed on Jun. 9, 2008, now Pat. No. 8,109,314.

(60) Provisional application No. 60/942,595, filed on Jun. 7, 2007.

(51) Int. Cl.
*B32B 37/10* (2006.01)

(52) U.S. Cl.
USPC ... 156/285; 156/580; 156/583.3; 100/269.01; 100/269.02; 100/269.03; 100/269.04; 100/269.06; 100/270; 425/389

(58) Field of Classification Search
USPC ..................... 156/285, 286, 356, 580, 583.3; 100/270, 269.01–269.04, 269.06, 100/269.13; 425/389, 390, 400
See application file for complete search history.

(56) References Cited

U.S. PATENT DOCUMENTS

| | | | | | |
|---|---|---|---|---|---|
| 3,964,958 | A | * | 6/1976 | Johnston | 156/382 |
| 4,334,850 | A | * | 6/1982 | Garabedian | 425/388 |
| 4,447,201 | A | * | 5/1984 | Knudsen | 425/397 |
| 5,318,647 | A | * | 6/1994 | Mitchell | 156/216 |
| 5,458,719 | A | * | 10/1995 | Pall et al. | 156/285 |

* cited by examiner

*Primary Examiner* — Christopher Schatz
(74) *Attorney, Agent, or Firm* — Schmeiser, Olsen & Watts LLP

(57) ABSTRACT

A portable air clamp for use during lamination of substrates is provided. The clamp includes a top clamp plate, a bottom clamp plate and at least one flexible, expandable tube within a housing of the clamp. The top clamp plate is adjacent to a top housing and the bottom clamp plate is adjacent to a bottom housing. An expandable tube or bladder may be disposed in the top housing or the bottom housing. The clamp may also include alignment devices and mechanisms for ensuring proper alignment of the substrates during the laminating procedure. The clamp is adapted to provide uniform pressure along the surfaces of the substrates to be laminated.

6 Claims, 7 Drawing Sheets

AIR CLAMP

CROSS REFERENCE TO RELATED APPLICATION

This application is a divisional application of U.S. patent application entitled "AIR CLAMP," Ser. No. 12/135,931, filed Jun. 9, 2008, now U.S. Pat. No. 8,109,314, which claims priority to U.S. Provisional Patent Application entitled "AIR CLAMP," Ser. No. 60/942,595, filed Jun. 7, 2007, the disclosures of which are hereby incorporated entirely herein by reference.

BACKGROUND OF THE INVENTION

1. Technical Field

This invention relates generally to a clamp with at least one internal air bag. More specifically, this invention relates to a clamp for use during laminating substrates that is portable and a method of using the clamp that includes manually positioning the clamp plates in contact with the substrates and then pressurizing the air bag in order to provide uniform pressure to the substrates along the length of the clamp.

2. State of the Art

In the manufacture of laminated articles, an adhesive layer is disposed at the interface between two substrates to be laminated. The two substrates are then clamped in place at selected intervals along their length while the adhesive cures using, for example, multiple C-clamps. To facilitate the curing, heat lamps may be pointed at the substrates. This laminating procedure has several disadvantages.

First, clamps positioned at selected intervals apply uneven pressure along the substrates, which causes uneven bonding between the laminated substrates. Uneven pressure and uneven bonding result in an inferior product and are more likely to cause breakage of the laminated pieces. This is a problem especially with laminating granite or other brittle materials.

Second, as the pressure is applied by the clamps, the substrates may slip out of alignment. Thus, applying several clamps while maintaining the alignment of the substrates requires a great deal of labor.

Third, heating the laminated pieces using heat lamps results in a great deal of wasted energy since most of the heat is lost into the surrounding environment. Utilizing heat lamps causes uneven heating, uneven curing and, thus, uneven bonding, resulting in an inferior laminated product that is likely to crack and break.

Accordingly, there is a need in the field of tools and methods for laminating substrates for a device that applies pressure and heat evenly along the surfaces of the substrates during laminating while also maintaining the desired alignment of the substrates.

DISCLOSURE OF THE INVENTION

The present invention relates to a clamp for use during lamination of substrates that is portable. The clamp includes a top clamp plate, a bottom clamp plate and at least one flexible, expandable tube within a housing of the clamp. The top clamp plate is adjacent to a top housing and the bottom clamp plate is adjacent to a bottom housing. An expandable tube or bladder may be disposed in the top housing or the bottom housing. In another embodiment, there is one expandable tube disposed in the top housing and another expandable tube disposed in the bottom housing. The expandable tube disposed in the top housing and the bottom housing may be filled with air in order to equally distribute force along the substrates. In other embodiments, one of the expandable tubes may be filled with a liquid to provide passive equal distribution of forces in response to the force applied by filling the other expandable tube with air. The clamp may also include alignment devices and mechanisms for ensuring proper alignment of the substrates during the laminating procedure. The clamp may further include a heating element attached to the top clamp plate and/or the bottom clamp plate that is the same size and shape as a face of the top clamp plate and/or the bottom clamp plate. Thus, the clamp is adapted to provide uniform pressure and, optionally, uniform heat along the surfaces of the substrates to be laminated. Additionally, the clamp provides greater pressure per surface area than a conventional clamp. Uniform pressure and heat during laminating results in a more uniform bond between the substrates and, thus, less breakage during and after lamination.

The present invention additionally relates to a method of using the clamp. An operator may position the substrates between the top clamp plate and the bottom clamp plate. The operator positions the clamp plates in abutting contact with the substrates and then, after ensuring proper alignment, locks the clamp plates in position. Then, a pressurized air source is connected to a valve that is coupled to the expandable tube. The tube is inflated and remains pressurized until an adhesive disposed between the substrate cures and the lamination procedure is complete.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to an air clamp for use during laminating substrates that is portable and includes an internal expandable tube for applying pressure evenly along the surfaces of the substrates. Additionally, embodiments of the present invention relate to methods of using the air clamp.

Figure 1:
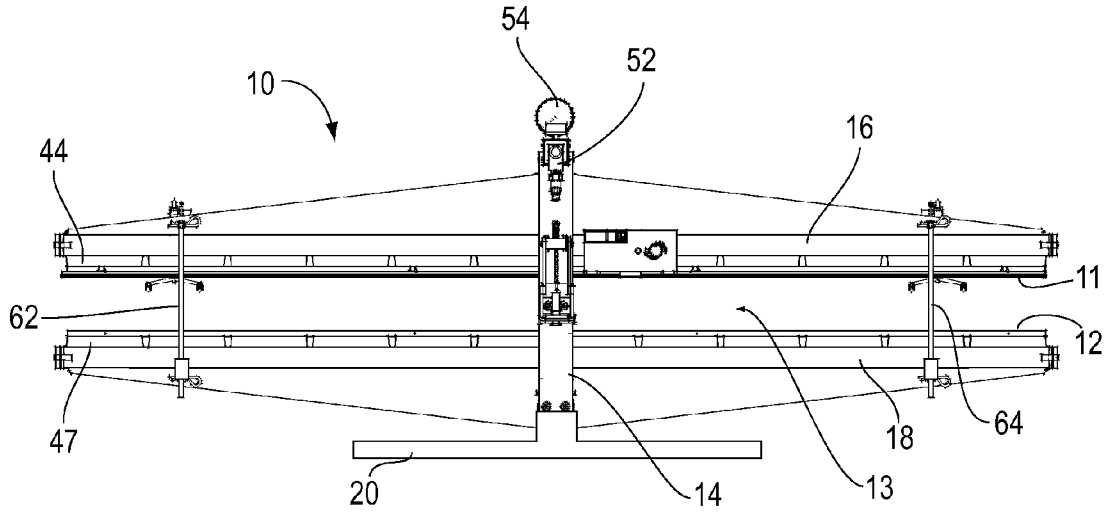
FIG. 1 is a front elevation view of an air clamp in the open position, in accordance with the invention.
Figure 2:
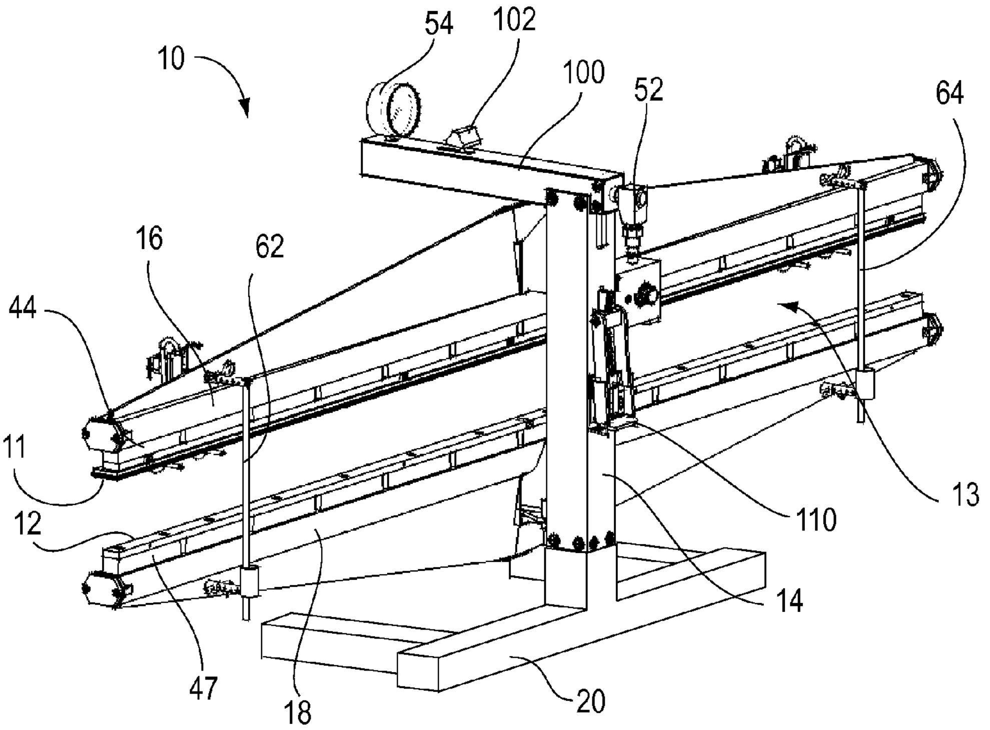
FIG. 2 is a perspective view of the air clamp in the open position, in accordance with the invention.
Figure 3:
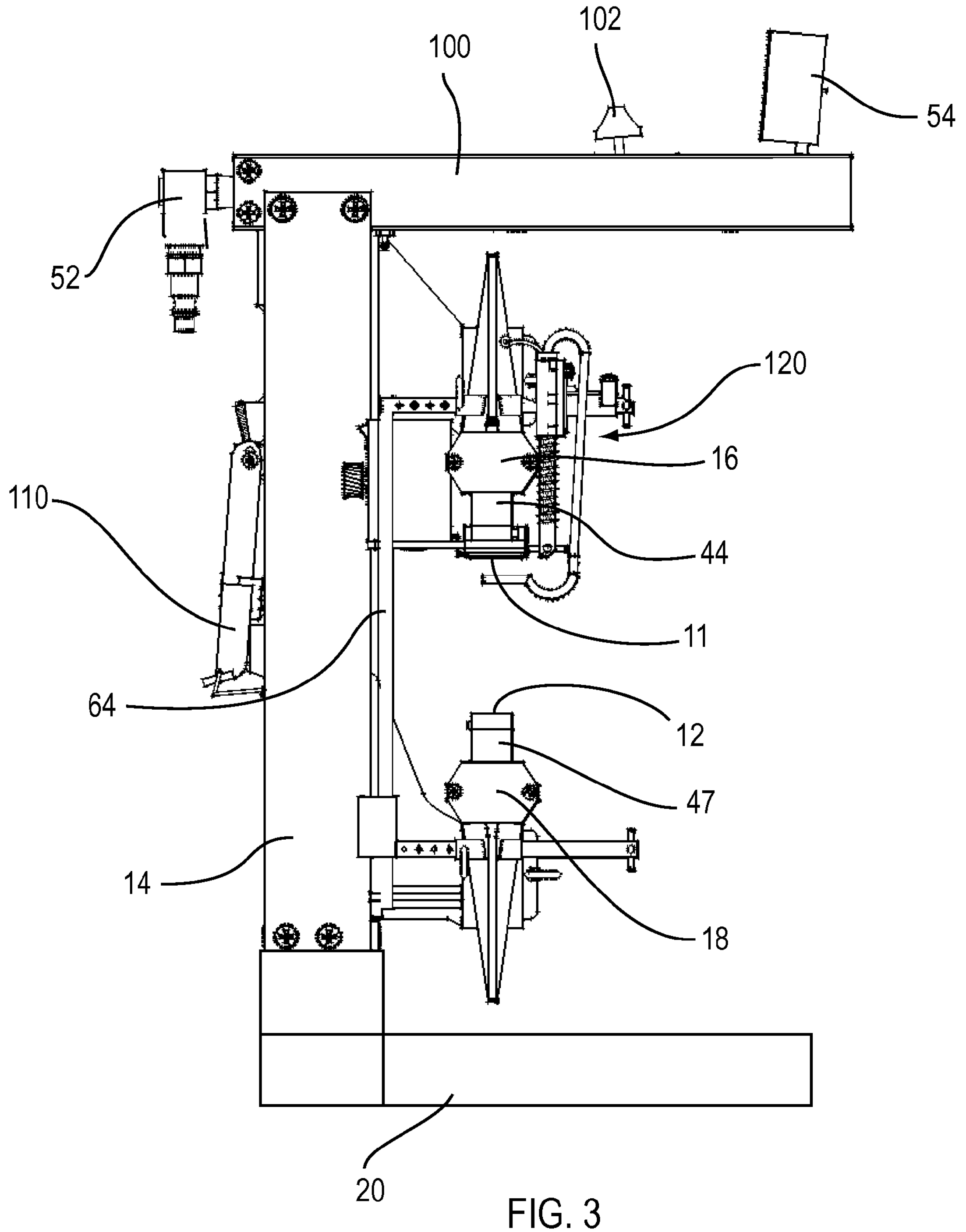
FIG. 3 is a side view of the air clamp in the open position, in accordance with the invention.

FIGS. 1-3 depict an air clamp 10 in the open position according to particular embodiments of the present invention. The clamp 10 includes a top clamp plate 11 and a bottom clamp plate 12. In this embodiment, the clamp plates 11 and 12 are rectangular in shape, but it should be noted that any size and shape can be used for the clamp plates 11 and 12 and the body of the clamp 10. For example, the clamp plates 11 and 12 may be square, oval, circular, hexagonal, etc. The desired size and shape of the clamp plates 11 and 12 are dependent upon the size and shape of the substrate to be clamped. In laminating granite for granite counter tops, for example, the clamp 10 may be relatively long and thin, as depicted in FIG. 1. The clamp 10 may further include frame 20 for supporting the clamp 10 in an inoperative position or storage when the air clamp 10 is not in use.

The top clamp plate 11 may be coupled to a top pillar bar ram 44 and the bottom clamp plate 12 may be coupled to a bottom pillar bar ram 47. The top pillar bar ram 44 may be operatively coupled within top housing 16 and the bottom pillar bar ram 47 may be operatively coupled within bottom housing 18.

The plates 11 and 12 may be coupled together in sliding engagement with control mechanism 14. In this embodiment, the control mechanism 14 is adapted to move the bottom plate 12 towards and away from the top plate 11. When the top clamp plate 11 is moved away from the bottom clamp plate 12, the clamp 10 is in an opened position and a substrate to be clamped may be positioned within the space 13 that is created between the plates 11 and 12. When the bottom plate 12 is moved towards the top plate 11, with a substrate within the space 13, the clamp 10 is in a closed position. The control mechanism 14 may include a ratchet pawl 110 that automatically locks the bottom plate 12 in particular positions as the bottom plate 12 is moved towards the top plate.

The control mechanism 14, as shown in FIGS. 9A-9D, may include a bottom clamp support 132 and a top clamp support 134. The bottom and top clamp supports 132 and 134 are each coupled to the bottom housing 18 and the top housing 16 respectively. The bottom clamp support 132 may further include compression plates 136. The compression plates 136 provide additional support in order to ensure that the air clamp 10 may operate at high pressures without failing or causing damage to the clamp 10. According to particular embodiments, the top clamp support 134 may be held in a stationary position and the bottom clamp support 132 is slideable along the control mechanism 14.

Figure 9A:
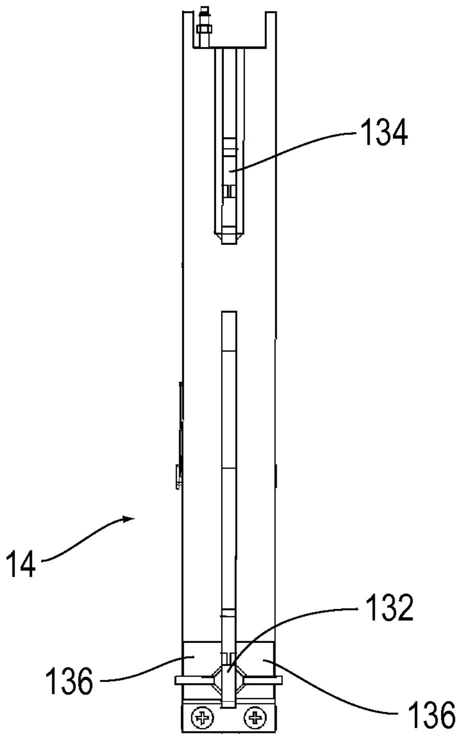
FIG. 9A is a rear view of a control mechanism of the air clamp, in accordance with the invention.
Figure 9B:
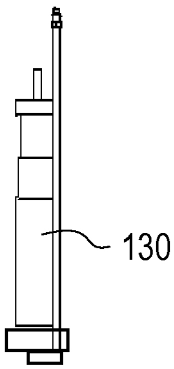
FIG. 9B is a side view of a ram of the control mechanism, in accordance with the invention.
Figure 9C:
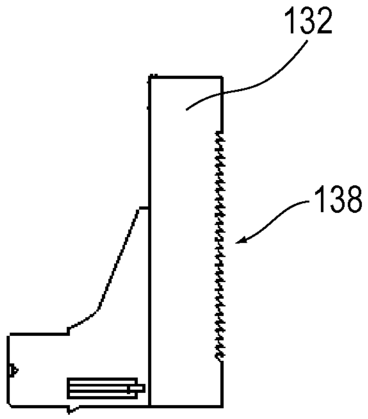
FIG. 9C is a side view of a lower clamp support of the control mechanism, in accordance with the invention.
Figure 9D:
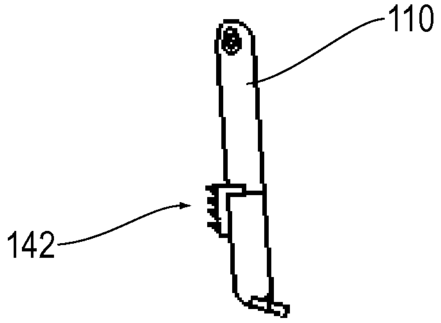
FIG. 9D is a side view of a ratchet pawl of the control mechanism, in accordance with the invention.

The control mechanism 14 may include a ram 130 (see FIG. 9B). The ram 130 may be an air ram. The ram 130 is adapted to move the bottom clamp support 132 toward and away from the top clamp support 134. This movement of the bottom clamp support 132 thereby results in the movement of the bottom clamp plate 11 toward and away from the top clamp plate 12, or between an opened and a closed position.

The bottom clamp support 132 may include teeth 138 in particular embodiments. The control mechanism 14 may also include a ratchet pawl 110 as shown in FIG. 2. The ratchet pawl 110 may include teeth 142. The bottom clamp support 132 and the ratchet pawl 110 may be operatively coupled to the control mechanism 14, wherein the teeth 138 of the bottom clamp support 132 is in operative connection with the teeth of the ratchet pawl 110. As the bottom clamp support 132 is moved in a direction toward the top clamp support 134, the ratchet pawl 110 retains the bottom clamp support 132 in position by automatically locking the bottom clamp support 132 in particular positions by use the teeth 138 and teeth 142. The ratchet pawl 110 may be rotatably coupled to the control mechanism 14, such that the teeth 142 of the ratchet pawl 110 may be rotated away from the teeth 138 of the bottom clamp support 132. This allows the bottom clamp support 132 to move in a direction away from the top clamp support 134.

Referring again to FIGS. 1-3, the top housing 16 and/or the bottom housing 18 may contain a flexible, expandable tube coupled to an air control device 100. The air control device 100 may include a valve 52 for admitting compressed air into the tube where the valve 52 is coupled to a regulator 54 and may further include a control switch 102 for controlling the admitting of compressed air, as will be discussed in greater detail below. The control device 100 admits air into the tube in order to allow the air clamp 10 to provide equally distributed force along the substrates between the top clamp plate 11 and the bottom clamp plate 12. Particular embodiments may further include flexible, expandable tubes in both the top housing 16 and the bottom housing 18. Air may be admitted into each tube by use of air control device 100. Other embodiments may employ a liquid, including, for example, a gel substance that is disposed in one of the tubes. The tube filled with a liquid is adapted to provide passive equal distribution of forces in response to the force applied by filling the other expandable tube with air.

The clamp 10 also includes aligning devices 62 and 64 for facilitating alignment of the substrates to be laminated, as will be discussed in greater detail below. The aligning device 62 and 64 may be adjusted to different lengths away from the tops and bottom clamps 11 and 12. The aligning device 62 and 64 may be independently adjustable.

Figure 5:
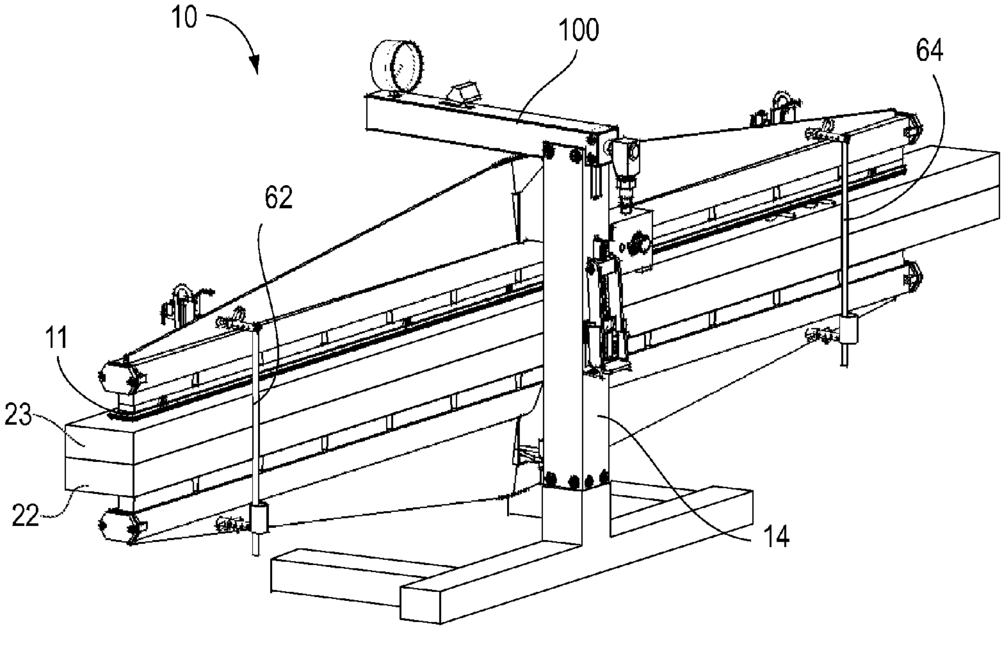
FIG. 5 is a perspective view of the air clamp during use, in accordance with the invention.
Figure 6:
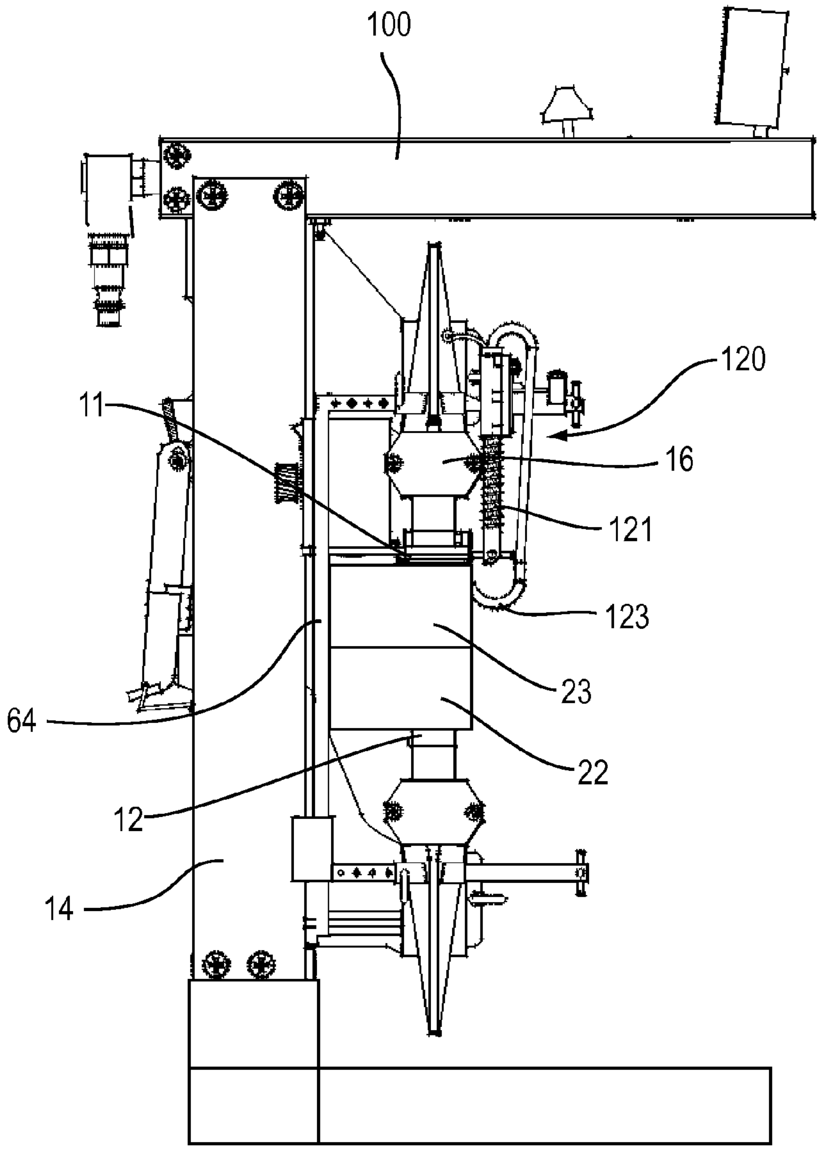
FIG. 6 is a side view of the air clamp during use, in accordance with the invention.

The substrates 22 and 23 to be laminated are shown in FIGS. 5 and 6 disposed between the top clamp plate 11 and the bottom clamp plate 12. In general, the substrates 22 and 23 are substantially flat. However, the substrates 22 and 23 may include curved portions, scratches, bumps, ridges and other inaccuracies on their surfaces. The clamp plates 11 and 12 may be made of a relatively soft and flexible material that conforms to the surfaces of the substrates 22 and 23 even if the surfaces include irregularities as described above. In addition, the soft and flexible material prevents the surfaces of the substrates 22 and 23 from becoming scratched or damaged. In particular embodiments, the clamp plates 11 and 12 include a rubber material that is relatively flexible. In other particular embodiments the rubber material is medium density vulcanized rubber material.

The substrates 22 and 23 are positioned within the space 13 between the clamping surfaces 11 and 12. The clamping plates 11 and 12 are slidingly coupled together with control mechanism 14. Thus, clamping plates 11 and 12 are moved towards each other until the clamping plates 11 and 12 are in abutting contact with the substrates 23 and 22, respectively. The arrangement of the plates 11 and 12 and the control mechanism 14 allows for a variety of substrate heights to be disposed between the plates 11 and 12. As shown in FIG. 2, the plates 11 and 12 are retained in the substrate-abutting position using C-clamps 25. However, in a particular embodiment, a locking mechanism is coupled to the plates 11 and 12 and the locking mechanism is engaged in order to retain the plates 11 and 12 in the substrate-abutting position. The locking mechanism may require only one operator.

In particular embodiments, a drip sheet may be disposed between the substrates and the bottom clamp plate 12. The drip sheet may be utilized to prevent dripping of adhesive from between the substrates and onto components of the air clamp 10. In particular, the drip sheet may be employed in such a manner as to protect the components of the air clamp 10 that may be damaged by adhesive contacting the components, such as, but not limited to all moving components of the air clamp 10.

Figure 4A:
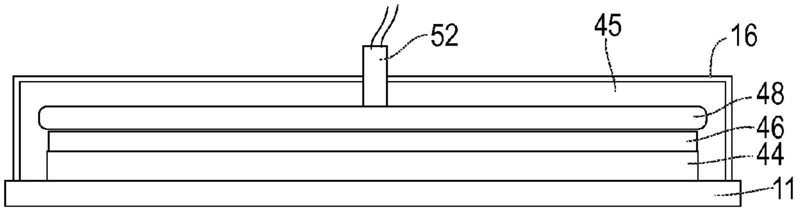
FIGS. 4A and 4B are cross-sectional views of the top portion of the clamp taken along the length and width, respectively, of the clamp in FIGS. 1 and 2, in accordance with the invention.
Figure 4B:
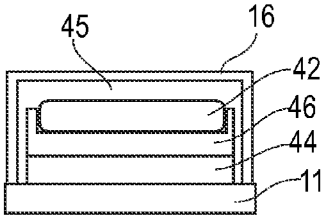

FIGS. 4A and 4B are cross sectional side views of the top portion of the clamp that depicts the internal components of the housing 16. The top clamp plate 11 is coupled to a ram bar 44. The ram bar 44 is slightly flexible so that the ram bar 44 and clamp plate 11 are able to conform to the surface of the substrate 23 even if the surface includes curved portions or other irregularities, as discussed above. A flexible, expandable tube 48 is positioned within a cavity 45 of the housing 16 and is attached to the air valve 52. Disposed between the tube 48 and the ram bar 44 is a shim 46 for protecting the tube 48. The shim 46 is depicted as being substantially U-shaped (see FIG. 4B) so that the protruding side portions of the shim 46 are in contact with the side surfaces of the tube 48. When the tube 48 is inflated, the shim 46 also prevents the sidewalls of the housing 16 from bending or protruding due to the high pressure in the tube 48. The internal surfaces of the cavity 45 may be coated with a friction-reducing material so that friction build up is prevented with the repeated inflating and deflating of the tube 48. In a particular embodiment, the internal surfaces of the cavity 45 are coated with polytetrafluoroethylene and/or a silicon lubricant. It should be noted that the bottom portion of the clamp 10 may be substantially similar to the top portion.

Figure 10A:
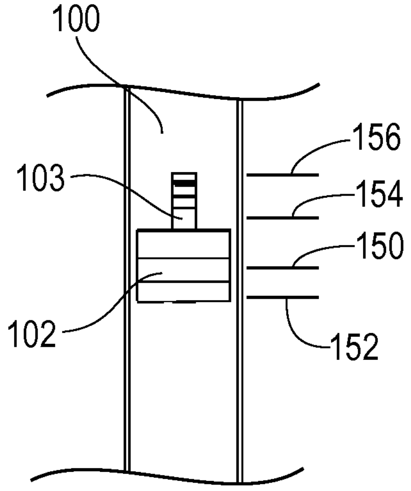
FIG. 10A is a top view of a portion of the air control device of the air clamp, in accordance with the invention.
Figure 10B:
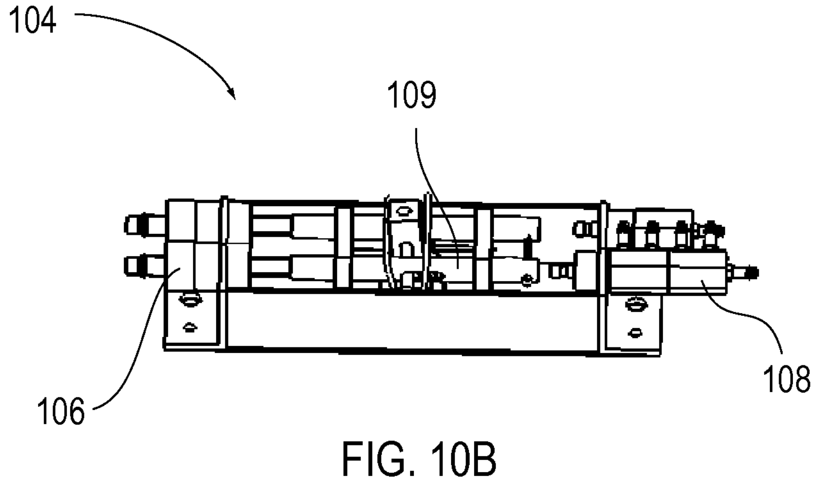
FIG. 10B is a perspective view of an air control cartridge of the air control device, in accordance with the invention.

Referring to FIGS. 2 and 10A-10B, particular embodiments of an air control device 100 include air valve 52. Air valve 52 may be a one-way valve and includes a pressure regulator 54. An air source may be connected to the valve 52 to inflate the tube 48 shown in FIGS. 4A-4B to a desired pressure. The air source may be disconnected and the air clamp 10 will remain in a closed position with the clamp plates 11 and 12 pressurized. In a particular embodiment, the air source is a pressurized air source. However, it should be noted that the air source may be any type of air source, including, but not limited to, compressed air and a manual pump for pumping air into the tube 48. An advantage of the one-way valve is that the pressure is maintained after the air source is disconnected.

The air control device 100 includes air control switch 102. The control switch 102 may be slideably coupled within channel 103. The control switch 102 may be a multi-position switch. The control switch 102, according to particular embodiments may have four positions. Position 150 may be a neutral position, where in air control device 100 does not perform any function. Position 154 activates the air control device to pressurize the ram 130 of the control mechanism 14 (see FIG. 9B) and depressurizes the tubes within the top housing 16 and/or the bottom housing 18. As the ram is pressurized, the bottom clamp plate 12 is moved toward the top clamp plate 11. Position 156 activates the air control device 100 to disable or depressurize the ram 130 and pressurizes the tubes within the top housing 16 and/or the bottom housing 18. Position 152 depressurizes both the ram 130 and the tubes within the top housing 16 and/or the bottom housing 18.

The air control device 100 may further comprise valve system 104. the valve system may include intake valves 108 for pressurizing the ram 130 and the tubes within the top housing 16 and/or the bottom housing 18. The valve system 104 may also include air outlet valves 106 and actuators 109. One actuator 109 may control the release of air from the ram 130 and the other actuator 109 may control the release of air from the tubes within the top housing 16 and/or the bottom housing 18. The actuators 109 are activated dependant upon the position of the control switch 102. The actuators 109 engage the intake valves 108 and the air escapes through the outlet valves 106.

It will be understood that any type of valve system may be employed within the air control device. This includes, but is not limited to standard valves and programmable valves.

In particular embodiments, the clamp 10 also includes alignment mechanisms for facilitating alignment of the substrates 22 and 23, as shown in FIGS. 5 and 6. First edge surfaces of the substrates 22 and 23 abut the aligning devices 62 and 64. Thus, the aligning devices 62 and 64 are used to facilitate the alignment of the first edges of the substrates 22 and 23 and maintain the aligned position during lamination. For use in specialty situations, the second edge surface of the substrate 23 may be contacted by flexible aligning mechanism 120, as shown in FIG. 6. The aligning mechanism 120 includes spring 121 that pushes the engagement members 123 into operative position. In a stored position the engagement members 123 are in a lifted position with the spring 120 compacted and locked in the compacted position. Once the engagement members 123 are in the operative position, the aligning mechanism 120 may be moved toward the substrate 23 to contact the second edge of substrate 23, thereby forcing the first edge of the substrate 23 into abutting contact and maintaining the abutting contact with the aligning devices 62 and 64. This ensures proper alignment of the substrates 22 and 23 during lamination in these specialty situations such as the lamination of a thin substrate to another substrate.

Figure 7:
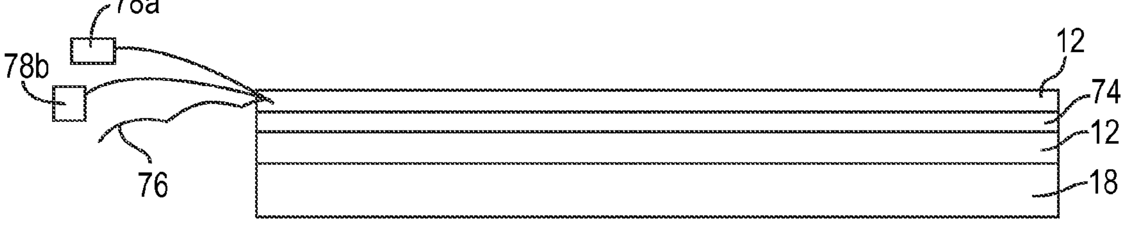
FIG. 7 is a side elevation view of the bottom portion of the clamp with a heating element taken along the length, in accordance with the invention.

As shown in FIG. 7, the clamp 10 optionally includes a heating element 72 that may be disposed between the clamp plate 12 and the substrate being laminated. The heating element 72 may be a thin, flexible layer that is the same shape and size as the plate 12. In a particular embodiment, the heating element 72 is in direct contact with the substrate. An insulating layer 74 may be disposed between the heating element 72 and the clamp plate 12 in order to prevent heat from flowing into the clamp plate 12, thus preventing energy loss and damage to the clamp plate 12. In particular embodiments, the insulating layer 74 may be a ceramic fiber layer. An electrical connection 76 supplies power to the heating element 72. The heating element 72 may also be operatively coupled to sensors 78*a* and 78*b*. Sensor 78*a* may be attached to the adhesive layer between the substrates being laminated in order to measure the temperature of the adhesive layer. Sensor 78*b* may be attached to the heating element 72. The sensors 78*a* and 78*b* may be part of a controller for automatically controlling the supply of power to the heating element 72 in order to maintain the temperature of the adhesive layer within a desired range. Alternatively, the temperature information provided by the sensors 78*a* and 78*b* may be used by an operator to manually adjust the supply of power to the heating element 72.

The heating element 72 and insulating layer 74 are optional and may be provided together as a single unit or cartridge that is removably secured to the clamp plate 12. It should be noted that the heating element 72 may alternatively or additionally be provided on the top clamp plate 11. The heating element 72 provides uniform heat distribution along the substrate being laminated and provides for a more controllable temperature relative to the use of heat lamps. Uniform heat distribution results in more uniform curing of the adhesive and, therefore, more uniform bonding between the substrates. Additionally, energy consumption is more efficient when using the heating element 72 instead of heat lamps as discussed above.

Clearly, the clamp 10 is not permanently attached to a particular location and the size and shape of the clamp 10 are such that the clamp is easily portable. The clamp may be easily transported and utilized on any desired job site.

Figure 8:
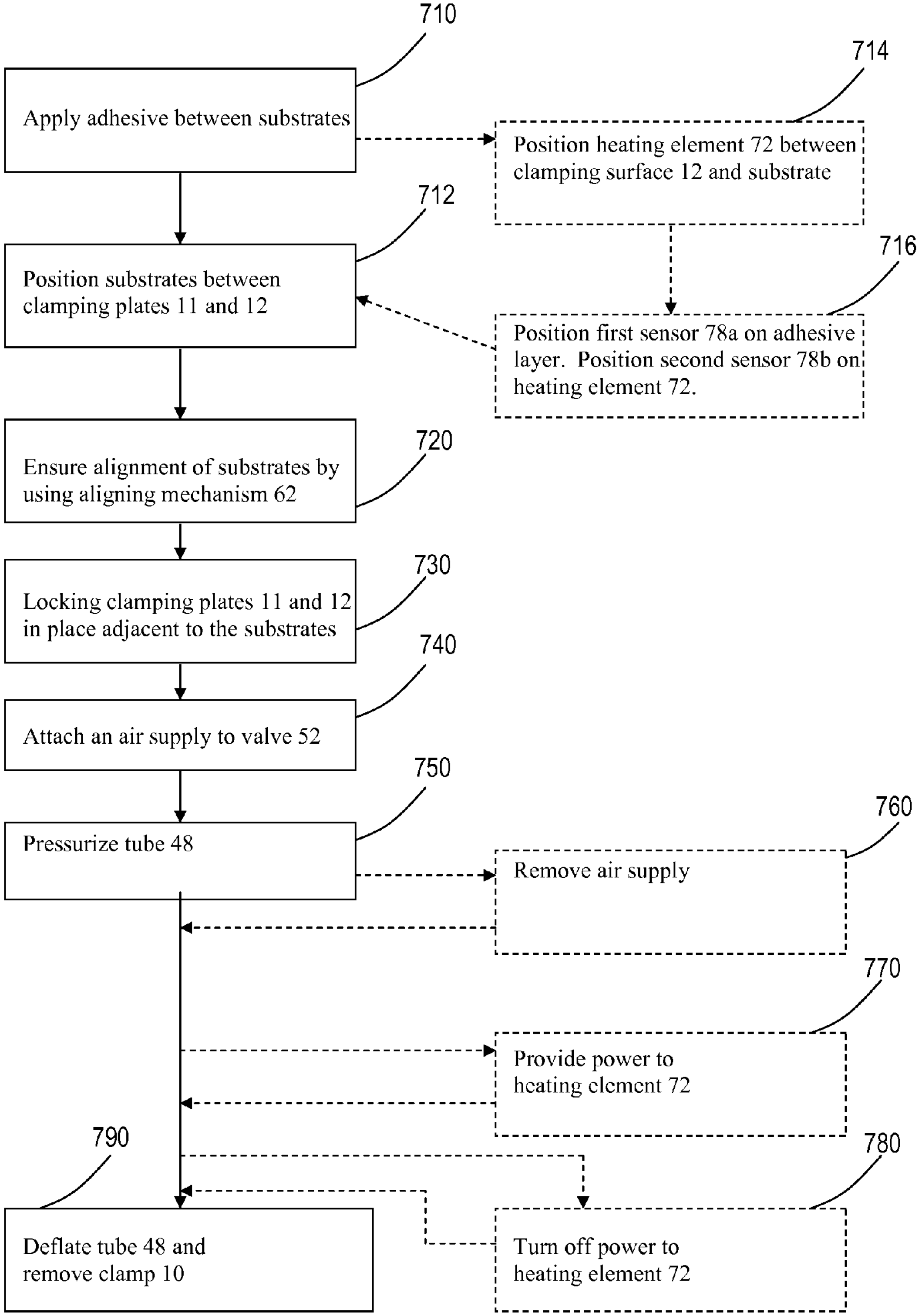
FIG. 8 is a flow chart of a method of using the clamp, in accordance with the invention.

A method 700 of using the clamp 10 is depicted in FIG. 8. Optional steps are denoted with dashed lines. First, in step 710, a layer of adhesive is applied at the interface between the substrates to be laminated. Then, in step 712, the substrates and the adhesive layer are positioned in the space 13 between the clamping plates 11 and 12 (refer to FIG. 1). Prior to step 712, a heating element 72 is optionally positioned adjacent to the bottom clamping surface 12 and the bottom substrate (refer to FIG. 6) in step 714. After the heating element 72 is positioned, a first sensor 78*a* is attached to the adhesive layer and a second sensor 78*b* is attached to the heating element 72, in step 716. Then, in step 720, the aligning mechanism 62 is applied to ensure alignment of the substrates (refer to FIG. 5). In step 730, a locking mechanism is locked to retain the clamping plates 11 and 12 in abutting contact with the substrates 22 and 23. In step 740, an air supply is attached to the valve 52. As discussed above, the air source may be pressurized air, a manual pump, or any other effective air supply means. In step 750, the tube 48 is inflated. Before inflating the clamping plates 11 and 12 may each have a certain amount of vertical movement. For example, and not as a limitation, each clamping plate 11 and 12 may move vertically about one-half inch. After pressurization, the clamping plates 11 and 12 are no longer moveable vertically. The arrangement of the coupling of the ram bars 44 and 47 to the respective housings 16 and 18 allows for movement of the ram bars 44 and 47 within the housings 16 and 18. Air pressure within the tube 48 assures even pressure over the entire area of the clamping plates 11 and 12 in contact with the substrates 22 and 23.

At this point, in step 760, the air supply is optionally removed and the tube 48 remains pressurized, as discussed above. Alternatively, the air supply could remain connected to the valve 52 for use in future laminating processes. After pressurization of the tube 48, power is provided to the optional heating element 72 in step 770 in order to heat the substrates during laminating. Providing heat during lamination reduces the curing time of the adhesive layer that is disposed between the substrates. In addition, providing heat uniformly across the substrates results in more uniform curing of the adhesive. The heating element 72 provides even heat distribution along the substrates 22 and 23, which results in a more uniform bond between the substrates. The tube 48 remains pressurized until the adhesive is cured and the laminating procedure is complete. Maintaining uniform pressure along the substrates 22 and 23 during laminating produces a more uniform bond between the substrates 22 and 23, which results in less breakage. Upon completion of the laminating procedure, the power supply to the optional heating element 72 is turned off in step 780, the tube 48 is allowed to deflate and the clamp 10 is removed from the laminated substrates in step 790.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the invention.

The invention claimed is:

1. A method of using an air clamp for laminating substrates, the method comprising:

positioning substrates between a top clamp plate and bottom clamp plate of the air clamp;

aligning substrates within the air clamp, wherein the air clamp comprises a first aligning device on a first side of the top clamp plate, said first aligning device connected to both the top and bottom clamp plates; a flexible alignment mechanism connected to the top plate on a second side of the top clamp plate, said second side opposite said first side; said flexible alignment mechanism independently adjustable from said first aligning device, wherein the flexible alignment mechanism comprises a substantially vertically oriented spring and at least one engagement member capable of contacting the substrates when in an operative position; wherein said spring is configured to move said engagement member between the operative position and a lifted, non-operative position;

pressurizing at least one flexible, expandable tube disposed in one of the top clamp housing and the bottom clamp housing; and maintaining the pressure until adhesive for laminating the substrates is cured.

2. The method of claim 1, further comprising depressurizing the at least one tube when curing is completed.

3. The method of claim 1, further comprising a step prior to positioning the substrates of positioning at least one heating element on one of the top clamp surface and the bottom clamp surface.

4. The method of claim 1, further comprising activating a ram of a control mechanism of the air clamp prior to pressurizing the at least one tube.

5. The method of claim 4, further comprising engaging the substrates between the top clamp plate and the bottom clamp plate in response to the activation of the ram.

6. The method of claim 1, further comprising attaching an air supply for operating the air clamp and removing the air supply after the at least one tube is pressurized.

* * * * *